May 27, 1969 H. W. BROWN ET AL 3,447,057
SOLID STATE POWER CONTROLLER FOR A.C. LOAD DEVICES
Filed July 14, 1966 Sheet 1 of 3
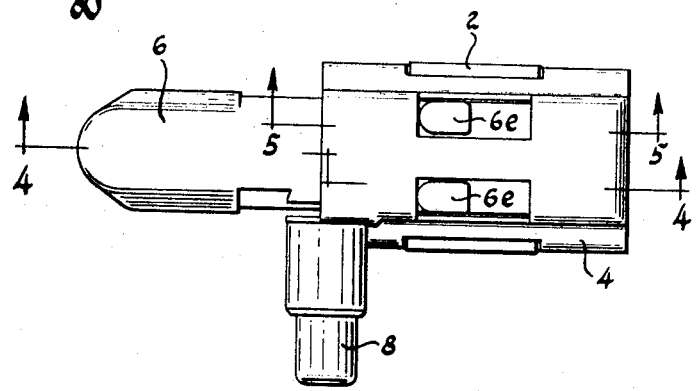
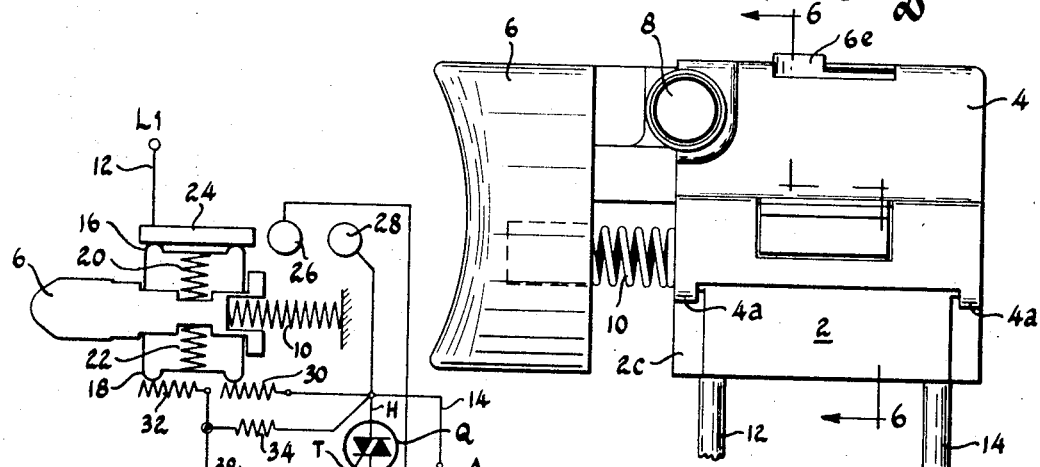
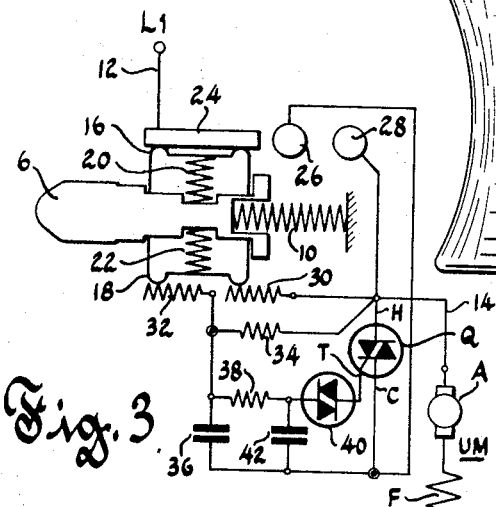
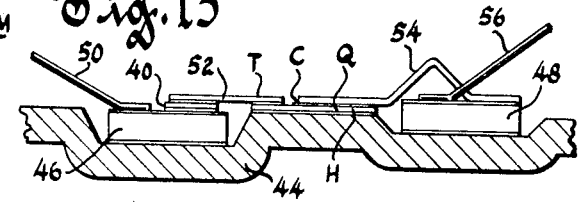
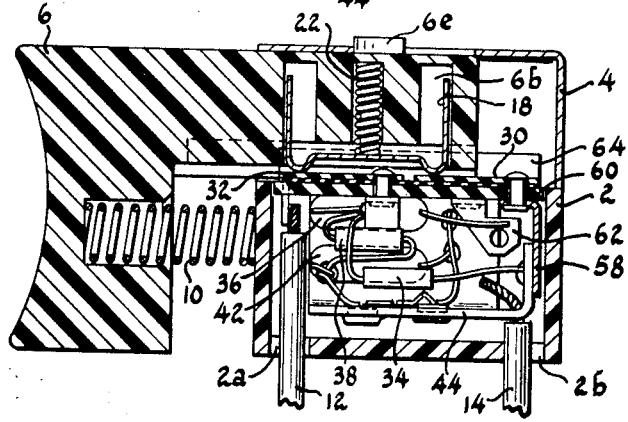

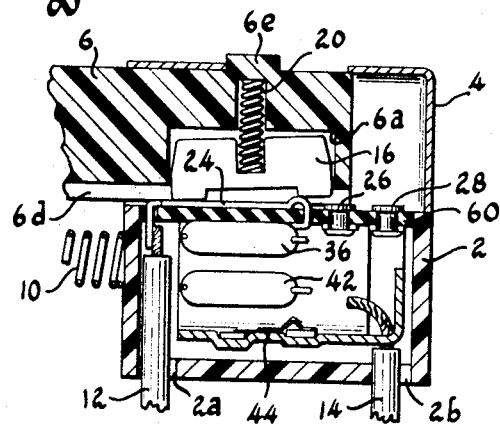
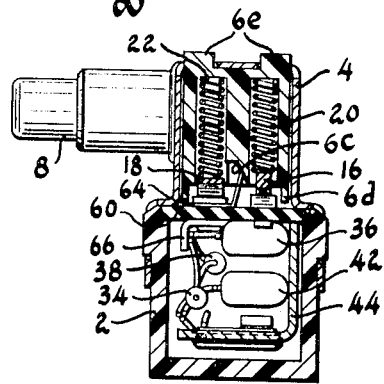
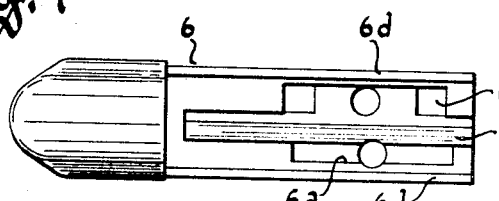
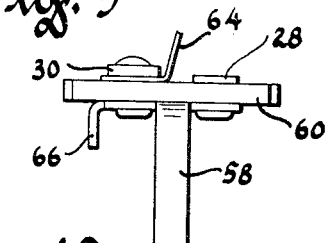
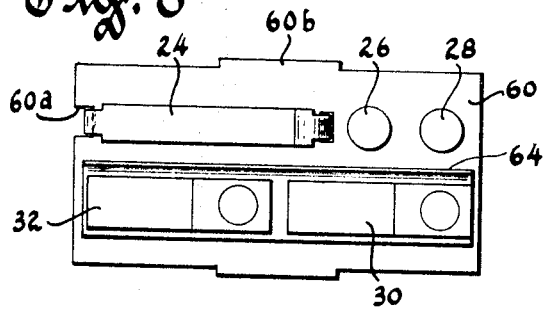
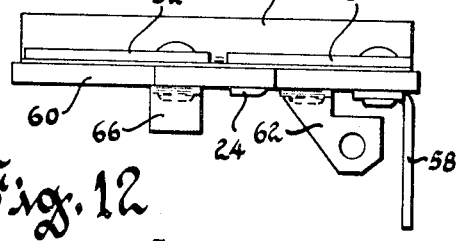
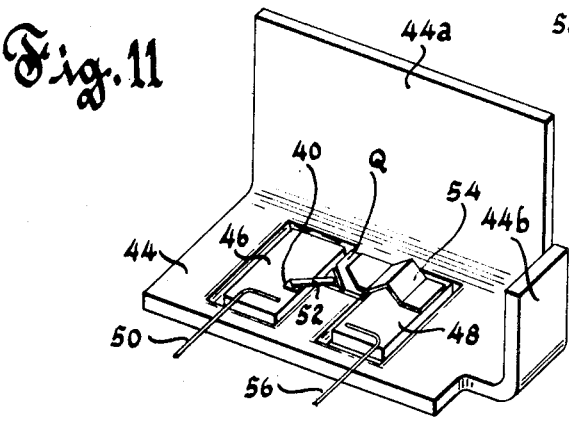
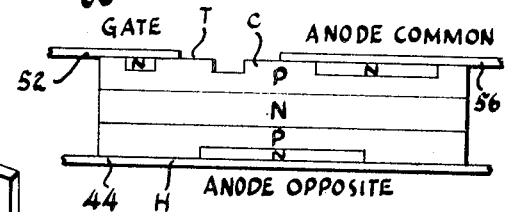

United States Patent Office 3,447,057
Patented May 27, 1969

3,447,057
SOLID STATE POWER CONTROLLER FOR A.C. LOAD DEVICES
Harry W. Brown, Big Bend, Wis., and Larry D. Thompson, Arlington, Tex., assignors, by direct and mesne assignments, to Cutler-Hammer, Inc., Milwaukee, Wis., a corporation of Delaware
Filed July 14, 1966, Ser. No. 565,192
Int. Cl. H02p 5/36, 7/58
U.S. Cl. 318—345                                     6 Claims

ABSTRACT OF THE DISCLOSURE

A solid state switching circuit and power controller for a portable electric tool employing a bidirectional thyristor triode and a trigger diode mounted on a common heat sink support, and a trigger circuit composed of two capacitors, a fixed resistor, and a variable resistor.

---

This invention relates to solid state power controllers for alternating current load devices and more particularly to a combined on-off switch and alternating current power controller for a portable electric tool.

While not limited thereto, the invention is especially applicable to adjusting the operating power or motor speed of alternating current portable tools such as drills, sanders, saws, heaters, lamps, fans, etc.

An object of the invention is to provide a solid state power control system of improved construction.

A more specific object of the invention is to provide an improved alternating current power adjusting device of the solid state type having a minimum number of electrical components.

Another specific object of the invention is to provide an improved solid state power control system mounted in the insulating housing of a trigger switch.

Another specific object of the invention is to provide the aforementioned system with an improved solid state subunit.

Another specific object of the invention is to provide the aforementioned system with an improved subunit comprising solid state devices and connectors mounted on a common heat sink and electrically wired.

Other objects and advantages of the invention will hereinafter appear.

According to the invention, there is provided a combined alternating current switch and power controller for portable tools. Both the switch and the A.C. power control circuit are housed within the insulating base of a trigger switch without any increase in the size thereof. The A.C. power control circuit comprises a solid state A.C. switching device such as a bidirectional thyristor triode known as a "Quadrac" for adjustably controlling the magnitude of alternating current flows to an electric motor such as for example a universal electric motor. This "Quadrac" and its solid state triggering device are mounted on a heat sink and pre-wired to terminals also mounted thereon to form a subunit which facilitates assembling of the system. This subunit and the other components of the circuit are mounted within the insulated housing of a standard size trigger switch. These components in the example illustrated comprise a pair of capacitors for charging to fire the triggering device, constant and variable resistors for controlling timed charging of the capacitors and trimming of the charging circuit and switch contacts for connecting power thereto and for shunting the same from the motor circuit. The elements of the control circuit other than the variable resistors and switch contacts are mounted along with the subunit within the cavity in the insulating base. The open side of the base is closed by an insulating mounting plate which supports the switch contacts, power control variable resistors and connectors for electrically connecting the elements of the device. The variable resistors lie flat on the insulating plate to prevent warpage. The movable bridging contacts of both the switch and potentiometer (variable resistors) are supported in the trigger and are separated from one another by an insulating barrier dividing the space between the insulating plate and the trigger to prevent switch arcing products from contaminating the variable resistors.

These and other objects and advantages of the invention and the manner of obtaining them will best be understood by reference to the following description of an embodiment thereof taken in conjunction with the accompanying drawings, wherein:

FIGURE 1 is an enlarged (2 to 1) top plan view of an A.C. trigger power control switch constructed in accordance with the invention;

FIG. 2 is a front elevational view of the A.C. power control switch of FIG. 1;

FIG. 3 is a partly schematic and partly diagrammatic illustration of the A.C. power control switch circuit;

FIG. 4 is a cross-sectional view taken along line 4—4 of FIG. 1 showing the variable resistors and other circuit components;

FIG. 5 is a fragmentary cross-sectional view taken along line 5—5 of FIG. 1 showing primarily the switch contacts;

FIG. 6 is a cross-sectional view taken along line 6—6 of FIG. 2 showing the relative positions of the variable resistors and switch contacts;

FIG. 7 is a bottom view of the trigger with the movable contacts and springs removed therefrom;

FIG. 8 is an enlarged (3 to 1) top plan view of the mounting plate subassembly;

FIG. 9 is a right end view of the mounting plate subassembly of FIG. 8;

FIG. 10 is a front elevational view of the mounting plate subassembly of FIGS. 8 and 9;

FIG. 11 is an enlarged (3 to 1) isometric view of the solid state subunit;

FIG. 12 is a greatly enlarged schematic cross-sectional view of the solid state "Quadrac" power control device which forms part of the subunit of FIG. 11;

FIG. 13 is a greatly enlarged cross-sectional view taken through the solid state devices on the subunit of FIG. 11;

Figures 14, 15, 16:
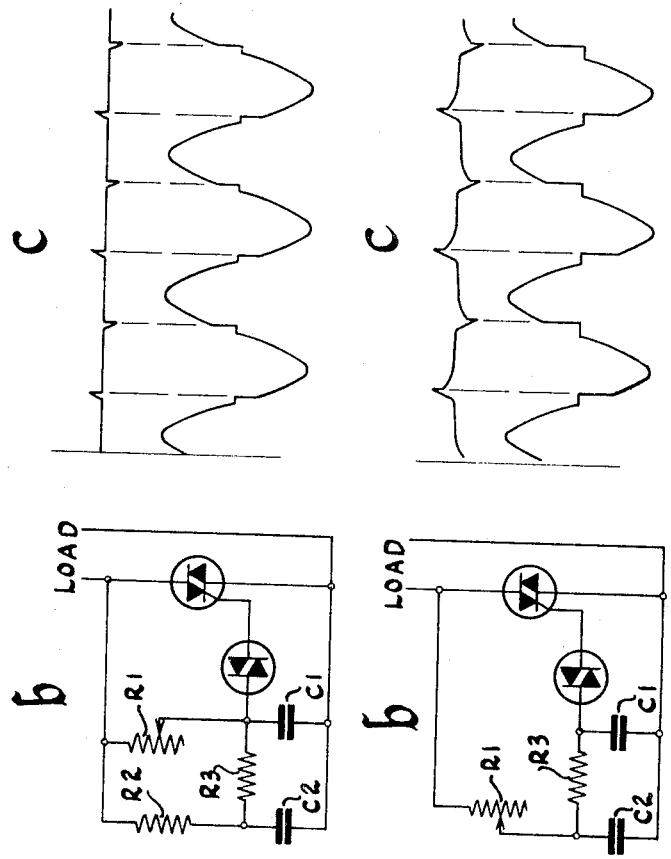
FIGS. 14a and 14b show a schematic diagram and operating characteristic curves of a single time constant prior art device for comparison with the invention.
FIGS. 15a, 15b and 15c show a schematic diagram and operating characteristic curves of a double time constant prior art device for comparison with the invention.
FIGS. 16a, 16b and 16c show a schematic diagram and operating characteristic curves of the simplified double time constant device of the invention illustrating advantages attained thereby.

Referring to FIGS. 1 and 2, there is shown an A.C. trigger power control switch having an external appearance substantially similar to the trigger switch in R. E. Larkin Patent No. 2,988,724 owned by the assignee of this invention, except that a modified trigger is used allowing the return spring to be placed below the trigger. The parts visible in FIGS. 1 and 2 comprise an insulating base 2, a switch frame 4 for securing a linearly slidable trigger 6 to the base, a lock button 8 mounted on the switch frame and a helical compression spring 10 between the trigger and base for biasing the trigger outwardly from the base. Conductors 12 and 14 extend from the base for connecting the circuit to an alternating current source and an A.C. load device.

As shown in the system diagram in FIG. 3, trigger 6 is adapted slidably to actuate two movable bridging contacts 16 and 18 when it is depressed against the force of spring 10. Movable contact 16 is pressed against the stationary contacts by an helical compression spring 20. Movable contact 18 is pressed against the variable resistors by a helical compression spring 22. The stationary contacts comprise an elongated contact 24 having a hump formed on one end as shown in FIG. 5, an intermediate contact 26 and a shunting contact 28. Intermediate contact 26 is between and spaced from contact 28 and the humped end of contact 24, all three contacts being arranged in a straight line. The other end of elongated contact 24 is connected through a conductor 12 to power supply line L1. Contact 26 is connected to common electrode C of the Quadrac Q and contact 28 is connected through conductor 14 to an armature winding A of a universal motor UM, the other side of the armature winding being connected through field winding F to power supply line L2 leading to the A.C. source.

As shown in FIG. 3, movable contact 16 is of bridging type having two rounded contacting points at its ends. Movable contact 16 normally is pressed against elongated contact 24 at both contacting points when the trigger is not depressed. When the trigger is depressed a first amount, movable contact 16 will bridge contacts 24 and 26 to connect the motor in series with the Quadrac across the power source. When the trigger is pressed a second amount, movable contact 16 slides over stationary contact 26 and then bridges contacts 24 and 28 to connect the motor directly across the power source whereby the Quadrac is shunted from the motor circuit.

The range of trigger depression during the aforesaid second amount controls the motor speed as hereinafter described. As shown in FIG. 3, the other movable contact 18 has two rounded contacting points at its ends which are normally pressed against the unconnected ends of two resistors 30 and 32, respectively. Two variable resistors rather than only one are used to obtain a larger resistance change per unit distance of trigger movement because the distance that the trigger can be moved is limited. Resistor 30 is connected at its other end to contact 28 and to "high" electrode H of the Quadrac. A trimmer resistor 34 is connected in parallel with the combination of resistors 30 and 32 and bridging contact 18. Trimmer resistor 34 is provided to compensate for mechanical variations such as tooling tolerances and electrical variations such as tolerances in component electrical values. This trimmer resistor will have a high resistance value in the neighborhood of one megohm or less depending upon test results. That is, each device is tested and when needed, the proper value of trimmer resistor is connected therein. Resistor 32 is connected at its other end through a capacitor 36 to common electrode C of the Quadrac. The junction between capacitor 36 and resistor 34 is connected through a resistor 38 and a solid state triggering device 40 to the trigger electrode T of the Quadrac. The junction between resistor 38 and triggering device 40 is connected through a capacitor 42 to common electrode C of the Quadrac.

The connections from capacitors 36 and 42 through triggering device 40 to trigger electrode T of the Quadrac provide a discharge path for capacitor 42 and provide a discharge path through resistor 38 for capacitor 36.

As will be apparent in FIG. 3, a first amount of depression of the trigger to bridge contacts 24 and 26 starts the motor running at a slow speed. For this purpose, on each alternate half-cycle of the alternating supply voltage when line L2 is positive relative to line L1, control current flows through the motor and then through conductor 14, a parallel circuit including resistors 30 and 32 and bridging contact 18 in one branch and resistor 34 in the other branch, a parallel circuit including resistor 38 and capacitor 42 in one branch and capacitor 36 in the other branch, switch contacts 26, 16 and 24 and conductor 12 to line L1. At the same time, positive voltage is applied to terminal H of the Quadrac. The control current charges capacitors 36 and 42 at a timed rate determined by the amount of resistance in their circuits.

On the opposite half-cycle of supply voltage when line L1 is positive relative to line L2, control current flows in the reverse direction through the control circuits hereinbefore described to charge capacitors 36 and 42 in the opposite direction or to the opposite polarity.

If the trigger is depressed more to cause bridging contact 18 decrease the resistance in circuit, the capacitors charge faster on each half-cycle of supply voltage. This capacitor charging rate can be adjusted through the range of trigger movement starting when contact 16 first engages contact 26 and during the sliding of contact 16 on contact 26 up to the point where contact 16 engages contact 28.

When the voltage on capacitor 42 reaches a predetermined value equal to the breakdown or break-over voltage of the triggering diode 40, this triggering device will be rendered conducting, in opposite directions on alternate positive and negative half-cycles of the supply voltage, and will discharge capacitor 42 in the trigger and common electrode circuit of the Quadrac. This pulse of capacitor discharge current fires the Quadrac into conduction and it will then continue conducting for substantially all of the remainder of the half-cycle of supply voltage. This Quadrac will stop conducting when the current flowing in its "high" and "common" electrodes circuit and the voltage thereacross decreases to zero at the end of the half-cycle or so near zero value that it will no longer sustain conduction. Capacitors 36 and 42 and resistors 30, 32, 34 and 38 form a delay network which controls the amplitude and phase of the voltage across capacitor 42 relative to the line voltage. When capacitor 42 is allowed to discharge into the gate of Quadrac Q by diode 40 switching from breakover to a lower voltage, Quadrac Q fires, shorting out the charging voltage from the delay network. Simultaneously, the delay network discharges through Quadrac Q, which is conducting, thus resetting the delay network toward zero until such time as Quadrac Q switches to the "off" or non-conducting state, which is at the time that the A.C. line current swing goes through zero. Therefore, the delay network is reset to zero every half cycle to begin charging from zero as the voltage increases from zero. Also resistor 38 limits the current into diode 40 and trigger electrode T or gate as resistor combination 30-32 approaches zero value. This not only protects the diode and gate but also the resistor strips from exceeding their maximum power dissipations during the finite time after the diode fires into the gate and until the Quadrac switches to its "on" state.

It will be apparent that when trigger 6 is pressed further to reduce the resistance, the capacitors will charge sooner to the triggering diode breakover voltage on each half-cycle thereby to trigger the Quadrac earlier on each half-cycle of supply voltage. This causes the motor to speed up since more A.C. electrical energy is now applied thereto.

The manner in which the A.C. power control circuit shown in FIG. 3 is enclosed in the trigger switch base which is no larger than the base shown in the aforementioned Larkin patent enclosing merely a switch and a connector will be described in connection with FIGS. 2 to 13 of the drawings. Base 2 has the shape of a rectangular box open at the top and having two holes 2a and 2b in the bottom, one adjacent each end wall, from which insulated conductors 12 and 14 emerge. As shown in FIG. 3, these conductors are adapted to connect the speed control switch to the motor or other A.C. load and to line L1, respectively. As shown in FIG. 2, the four corners, on the outside of the base are cut away or provided with molded recesses 2c about halfway up from the bottom to provide grooves ending in undercut overhangs under which four tabs 4a of the metal frame are bent to secure the frame and trigger to the base.

As shown in the subunit of FIGS. 11 and 13, the Quadrac Q is soldered to a heat sink 44 at an intermediate point between two depressions formed in the heat sink to accommodate terminal boards 46 and 48. These terminal boards are of the type normally used for printed circuits and comprise an insulating board having conductive foil bonded to both surfaces. One surface of board 46 is rigidly secured as by soldering or cementing in the left-hand depression in the heat sink as shown in FIG. 13. One surface of board 48 is similarly secured in the right-hand depression in the heat sink. The "high" electrode H of Quadrac Q on the lower surface thereof is rigidly and conductively secured as by soldering to the upper surface of the heat sink between the two depressions so that heat sink 44 forms a terminal for the Quadrac. Triggering diode 40 has one terminal on the lower surface thereof rigidly and conductively secured as by soldering to the upper surface foil of terminal board 46. A conductor 50, for subsequent connection to resistor 38 and capacitor 42 (FIG. 4), is also soldered to this upper foil as shown in FIG. 13. The other terminal of triggering diode 40 on the upper surface of the wafer is connected by a short conductor 52 to the gate electrode T of the Quadrac on the upper surface of the near corner thereof, there being a groove in the wafer to separate the triggering electrode or gate from the common electrode as shown in FIG. 12. This common electrode C is connected by a humped conductor 54, as shown in FIG. 13, to the upper surface foil of terminal board 48 to which is also connected a length of conductor 56 whereby the Quadrac is subsequently connected in the circuit.

As shown in FIG. 11, the portion of heat sink 44 on which the solid state devices are mounted is generally horizontal except for the two depressions. The rear portion 44a of the heat sink is bent upwardly along the rear wall of the base as shown in FIG. 6 to form a large area for dissipating heat. The right end of the heat sink has a narrow strip 44b bent upwardly which is electrically connected as by welding to the suspended terminal 58 of resistor 30. The vertical back portion of the heat sink also provides a convenient place to electrically connect the bare end of conductor 14 as shown in FIGS. 4 and 5.

The aforementioned subunit comprising the heat sink and solid state devices, terminal boards and conductors is assembled beforehand and the solid state devices are passivated to prevent damage thereto and variation in their characteristics under ambient conditions without the necessity of hermetically sealing each of them as for example enclosing each in a metal can. This subassembly which is made under controlled conditions then can be connected into the circuit by conductors 50 and 56 and heat sink 44 without the danger of applying undue heat on the solid state devices from soldering and without the necessity of having to exercise extreme care.

As shown in FIGS. 8 to 10, the power control switch is provided with a mounting plate subassembly to which the circuit components and conductors are attached before it is inserted onto the base. This subassembly comprises the row of stationary contacts, heretofore described in connection with FIG. 3, mounted on the upper surface of one-half of mounting plate 60 and a pair of resistance strips mounted flat on the upper surface of the other half of the mounting plate with an insulating barrier therebetween. More specifically, stationary contact 24 which is in the form of a narrow strip lies along the upper surface of the mounting plate. The left-hand narrowed end of contact 24 is bent down through a notch 60a in the left-hand end of the mounting plate to form a connector below the mounting plate to which the bared end of conductor 12 is connected as shown in FIGS. 4 and 5. The other narrowed end of contact 24 is bent down through a hole in the mounting plate and is bent back flat against the lower surface of the mounting plate to secure the contact rigidly thereto. As shown in FIG. 5, the portion of contact 24 immediately adjacent such other narrowed end is formed with a rounded hump to enhance quick opening of the contacts when the trigger is released.

Stationary contact 26 which is spaced from the right-hand end of contact 24 is in the form of a flat-head rivet whose shank extends through a hole in the mounting plate and is secured therebelow to a suspended connector 62 shown in FIG. 10 having a hole therein to which the common lead of the Quadrac and one lead of each of capacitors 36 and 42 are connected by soldering, welding or the like, as shown in FIG. 4.

Stationary contact 28 which is spaced toward the right from contact 26 is also in the form of a flat-head rivet whose shank extends down through a hole in the mounting plate and is secured therebelow to connector 58, this connector being also connected to one lead of resistor 34, to the high electrode H of the Quadrac through heat sink 44 and through heat sink 44 to conductor 14 which leads to the motor as shown in FIG. 4.

On the other half of the upper surface of the mounting plate lies an insulating strip 64 as shown in FIGS. 8 to 10. The strip is bent along the middle of its longer dimension to an angle as shown in FIGS. 6 and 9. This insulating strip which forms an arc barrier is made of pressed fiber or the like and one half of it is bent to an angle of about 60 degrees from the other half so that it springs back to an angle of about 95 degrees from the other half thereof. That is, the arc barrier is provided with a bias tending to increase the angle between the halves thereof so that it will inherently hug a groove wall in the trigger and close the space between the contacts and resistors as hereinafter described.

Resistors 30 and 32 are in the form of flat strips, each having a resistance coating about two-thirds of the way from the left end and a good conductor coating such as a silver connector coating for the remaining one-third of its upper surface and a rivet hole through this connector portion. These two resistor strips lie along the horizontal half of the arc barrier with connectors at the right and in slightly spaced apart longitudinal alinement and are riveted to the mounting plate through the holes therein and through holes in the arc barrier and mounting plate. Resistor 30 is to the right of resistor 32 as seen in FIGS. 4, 8 and 10. The rivet of resistor 30 also connects to connector 58 below the mounting plate, connector 58 being provided with two tabs with holes therein as shown in FIG. 9. The rivet of resistor 32 secures a short connector 66 in suspended relation at the lower surface of the mounting plate for connection to one lead of each of resistors 34 and 38 and capacitor 36 as shown in FIG. 4.

With the aforementioned connections made, the subassembly shown in FIGS. 8–10 plus the two resistors and two capacitors and subunit 44 and conductors 12 and 14 connected thereto are now ready to be housed in the base. The conductors are inserted through the holes in the bottom of the base and the assembly is inserted in the base so that mounting plate 60 closes the open top thereof. As shown in FIG. 8, the mounting plate is provided with short projections 60b centrally of its two longer edges fitting into complimentary grooves in the side walls of the base to support these portions of the mounting plate while the corners are supported by suitable protrusions molded integrally within the corners of the base.

As shown in FIGS. 4 to 6, the trigger which is molded of insulating material is provided with means accomodating two spring biased bridging contacts 16 and 18 for engaging the stationary contacts and resistor strips, respectively, when the trigger is depressed. This means comprises a pair of spaced, parallel, narrow and elongated cavities 6a and 6b extending from the bottom of the trigger upwardly into the trigger. As shown in FIG. 7, the two cavities are about equal in length but cavity 6a for the switch contact is displaced slightly to the right relative to the other cavity since contact 28 is to the right of the resistance coating portion of resistor 30 as shown in FIG.

8. As shown in FIG. 5, except for the center bore, cavity 6a is of constant depth for receiving a relatively thick bridging contact 16. As shown in FIG. 4, cavity 6b is deeper at its ends for receiving the upstanding arms of bridging contact 18 which is substantially U-shaped. Each such cavity has at its center a round bore for retaining a helical compression spring. As shown in FIGS. 4 and 5, spring 20 biases bridging contact 16 downwardly against switch contact 24 and spring 22 biases bridging contact 18 against the resistor strips.

Bridging contact 16 is made of a relatively thick solid flat piece of conducting material such as copper because it carries the motor current. As shown in FIG. 5, contact 16 has a slot extending part way down from its upper edge at the middle for retaining the lower end of compression spring 20. The lower edge of contact 16 is cut out at the center to provide a pair of short contacting legs, one at each end, for engaging common contact 24 and either contact 26 or 28 and for providing clearance for the hump on contact 24. The cavity in the trigger is deep enough so that contact 16 can move resiliently up or down a limited amount under the bias of the spring.

Bridging contact 18 shown in FIG. 4 is made of a relatively thin strip of conductive material such as bronze since it carries the relatively much smaller capacitor charging current. This contact is formed into the shape of a U with its contacting portions at the end looped downwardly and rounded for sliding contact with the flat upper surfaces of resistors 30 and 32. The midportion of contact 18 between the contacting portions is offset upwardly to clear the rivet head which secures resistor 32 to the mounting plate. Also, the center portion of this contact may be provided with a boss on top fitting into the lower end of spring 22 to keep the spring from sliding along this contact.

As shown in FIGS. 6 and 7, the lower side of the trigger between the contact cavities is provided with an elongated channel or groove 6c for receiving the upstanding portion of the arc barrier 64. This groove 6c communicates with cavity 6b as shown in FIG. 6. The bias in this arc barrier presses it against the right-hand angular wall of groove 6c as shown in FIG. 6 to close completely the space between the switch contacts and resistor strips. Hanging skirts 6d on opposite sides of the trigger slide along plate 60 and also confine the resistor strips from turning on their rivets.

The helical compression springs and bridging contacts are assembled in the cavities in the trigger, the trigger is placed in the switch frame so that the two upstanding projections 6e at the top of the trigger enter apertures in the top of the switch frame as shown in FIG. 1, return spring 10 is placed in its hole in the trigger and the trigger and switch frame subcombination is then placed on the base and the tabs of the switch frame are bent in to secure the parts together.

As shown in FIG. 12, the bidirectional thyristor triode or Quadrac has PNPN layers in both direction between the main conduction electrodes H and C with each such electrode being in contact with both a P and an N layer. The gate or trigger electrode T is in contact with both a P and an N layer to initiate conduction in either direction between the main electrodes whereby to control alternating current power.

The schematic circuit diagrams and operating characteristic curves in FIGS. 14, 15 and 16 illustrate the advantages of the invention over prior art devices. FIG. 14a shows the capacitor voltage at the top and the load voltage at the bottom for the single time constant prior art circuit of FIG. 14b set for low power output. This prior art circuit has the disadvantages that it is subject to "hysteresis" effect and requires readjustment after starting to get the lowest possible power output. This hysteresis effect is illustrated by the load voltage curve in FIG. 14a. As shown therein, upon starting, the Quadrac fires at a given phase angle in the first half cycle but then fires at an earlier phase angle on the second and subsequent half cycles. The cause of this hysteresis is shown in the upper curve in FIG. 14a which illustrates the capacitor voltage. As shown therein, when the triggering voltage is reached, the trigger device discharges the capacitor to a lower voltage value. If at maximum resistance in circuit, the first firing occurs at about 170 degrees of the 180 degree positive half-cycle of supply voltage, the firing will occur earlier than 170 degrees on the following negative half-cycle of supply voltage and on subsequent positive and negative half-cycles. Thus, there will be a shift of firing point from the first to the second half-cycle which will then remain constant on subsequent half-cycles, this shift being called the hysteresis effect. This effect is caused by the capacitor being partially discharged on the first firing and the fact that the capacitor charging in the reverse polarity on the negative half-cycle does not start from the beginning of such half-cycle as in the first instance but instead starts some time prior thereto, as for example, from the 170 degree point on the preceding half-cycle. For example, when the voltage amplitude is lower than trigger firing voltage, the capacitor does not discharge but continues to follow and to lag the line voltage. Therefore, the capacitor voltage reaches zero after the line voltage. As the resistance value is decreased, the phase angle advances and the amplitude increases until the amplitude is sufficient to fire the trigger diode and in turn to fire the Quadrac. When the Quadrac fires, it partially discharges the capacitor so that at the beginning of the next half-cycle the capacitor will charge at a faster rate effectively advancing the phase angle. Also, since the capacitor is now partially discharged at the beginning of each half-cycle and is charging at a faster rate and to a higher voltage, the phase angle can be retarded by increasing the resistance and the Quadrac will fire with more delay than at the start of the initial conduction. The delay network overcomes the hysteresis by maintaining a high voltage at even greater phase angle delay. The shift in firing point from the first cycle to the second and subsequent cycles is not noticeable on lights or motors but the difference between the turn on and turn off of the Quadrac or similar device is. For this reason, the capacitor voltage reaches the firing value earlier. It will be apparent that this requires readjustment of the firing angle nearer to the end of the half-cycle after starting to get the lowest power output that is possible with this circuit.

Use of two capacitor circuits as in FIG. 15, that is, adding another time constant circuit reduces this hysteresis effect to an insignificant amount thereby to extend the control range at the low power end. FIG. 15a shows at the top the capacitor C1 voltage and shows at the bottom the load voltage for low power output from the two time constant prior art circuit of FIG. 15b. As shown in FIG. 15a, the hysteresis effect has been substantially reduced by addition of the second time constant circuit including capacitor C2. When capacitor C1 is partially discharged on the first firing of the Quadrac, capacitor C2 partially recharges capacitor C1 by current flow through resistor R3 as shown by the rising characteristic in the upper curve in FIG. 15a immediately following each firing. Due to this recharging of capacitor C1 by capacitor C2, the starting point for the charging of capacitor C1 in the reverse direction on the second half cycle is adjusted so that the firing will take place at substantially the same phase angle on the second half cycle and on subsequent half cycles as it did on the first. This means that the circuit of FIG. 15b can be started at its lowest power output and no readjustment is necessary after starting as was the case in FIGS. 14a–b.

FIG. 15c shows the capacitor C1 voltage above and the load voltage below for high power output from the two-time-constant circuit of FIG. 5b. These curves illustrate the conditions present when resistor R1 is shunted entirely out of circuit. Under this condition, the Quadrac is fired early in each half-cycle and will conduct over substantially 172 degrees of each 180 degree half-cycle providing substantially 99.5 percent of full load current. Full load current is provided when the Quadrac is shunted out of the load circuit by the switch. This maximum conduction angle and percentage of full load current should be kept in mind for comparison with corresponding characteristics of the invention described immediately hereinafter.

FIG. 16a shows the capacitor C1 voltage above and the load voltage below for low power output in the circuit of the invention illustrated in FIG. 16b. It will be described hereinafter how substantially as good performance can be obtained in the improved circuit of FIG. 16b as was obtained in the prior art circuit of FIG. 15b while at the same time eliminating one component. It will be apparent that in FIG. 16b, adjustable resistor R1 has been reconnected in place of resistor R2 and resistor R2 has been eliminated completely. This provides a saving in cost and space required for the completed device.

The curves in FIG. 16a are substantially like the corresponding curves in FIG. 15a. That is, after each firing, capacitor C2 discharges through resistor R3 to recharge capacitor C1, providing the rising characteristic in the upper curve in FIG. 16a. Thus, hysteresis is substantially reduced in the same way so that firing will take place at the same phase angle on the first and subsequent half-cycles of supply voltage.

It has been discovered, however, that if the variable resistor R1 is reconnected as shown in FIG. 16b, the constant resistor R2 (shown in FIG. 15b) can be eliminated without significant effect on the performance. The charging current for capacitor C1 must now flow through resistor R3 also. As shown in the lower curve in FIG. 15c, at high power output when resistor R1 is shunted out of the circuit, the Quadrac will conduct over substantially 155 degrees of each 180 degree half-cycle. While this might initially appear to be a big difference compared to the 172 degree maximum conduction angle in FIG. 15c, the difference in load current is actually insignificant as determined by actual measurement. This conduction angle of 155 degrees provided 99.1 percent of full load current as compared to 99.5 percent in FIG. 15c. This small difference in current is due to the fact that the effect takes place at the leading end of the half-cycle where amplitude is small. As will immediately be appreciated, this small difference in available load current percentage is insignificant particularly since it occurs at the high power or high motor speed end of the control range where small adjustment or control is usually not even required in most applications.

While the apparatus hereinbefore described is effectively adapted to fulfill the objects stated, it is to be understood that we do not intended to confine our invention to the particular preferred embodiment of solid state power controller for an A.C. load device disclosed, inasmuch as it is susceptible of various modifications without departing from the scope of the appended claims.

We claim:

1. In a solid state power controller for an alternating current load device, the combination comprising:
   an alternating current source;
   an electrical power control circuit;
   an actuating lever;
   switch means responsive to a small amount of movement of said actuating lever for energizing said power control circuit from said source to initiate energization of the load device;
   adjustable means responsive to further movement of said actuating lever for operating said power control circuit to apply continuously increasing alternating current power to the load device to substantially full load power in proportion to such movement;
   and said power control circuit comprising a subunit including a controllable bidirectional thyristor triode and a semiconductor trigger diode mounted on a common heat sink support;
   means in said subunit for connecting said triode in the power control circuit to control electrical power applied from said source to the load device;
   means in said subunit for connecting said diode to the trigger electrode of said triode to control firing of the latter;
   and variable control signal forming means including said adjustable means for rendering said trigger diode conducting at a desired adjustable point on each half-cycle of the source voltage to fire said triode comprising:
   a first capacitor connected across said diode and the trigger electrode and one main electrode of said triode for charging on each half-cycle of the source voltage to a voltage which renders said diode conducting;
   a second capacitor connected in series with said adjustable means across the main electrodes of said triode for charging on each half-cycle of the source voltage;
   and an impedance connected from the junction between said second capacitor and said adjustable means to said diode;
   said impedance forming a path through which said first capacitor is charged and through which said second capacitor recharges said first capacitor each time after the latter sends a current pulse into said trigger diode.

2. The invention defined in claim 1, wherein said variable control signal forming means further comprises:
   a trimmer resistor connected across said adjustable means.

3. The invention defined in claim 1, together with an insulating housing surrounding said power control circuit and mounting said actuating lever for manual operation.

4. In an electric motor operated portable tool connectable to a commercial alternating current power source and having a hand grip including an opening therein for an operating trigger, the improvement comprising:
   a self-enclosed, trigger-actuated motor control apparatus adapted for mounting within the hand grip with its trigger extending through the opening for engagement by a finger of the user comprising:
   motor speed control means adapted for connection to the motor and source;
   switch means responsive to a small amount of depression of said trigger for energizing said motor speed control means from said source to start the motor operating at a slow speed;
   adjustable means responsive to further depression of said trigger for operating said motor speed control means to effect continuous speed increase to substantially full speed of the motor in proportion thereto;
   and said motor speed control means comprising a subunit including a controllable solid state alternating current switching device and a firing control semiconductor device mounted on a common support, and means connecting said firing control semiconductor device to said A.C. switching device to control the latter in response to a predetermined voltage;
   means adapted for connecting said A.C. switching device to the motor;
   and means under the control of said adjustable means and said source for developing said predetermined voltage on each successive half-cycle of the alternating voltage comprising:
   a pair of capacitors and a resistor, first ends of said capacitors being connected together and to a main electrode of said A.C. switching device, the other ends of said capacitors being connected through said resistor, such other end of one of said capacitors being connected to said firing control semiconductor device, and such other end of the other capacitor being connected to said adjustable means.

5. The invention defined in claim 4, wherein said common support for said subunit comprises:
a heat sink to which said A.C. switching device is conductively secured so that said heat sink forms one main electrode terminal therefor.

6. The invention defined in claim 4, wherein said common support for said subunit comprises:
a common mounting base for said controllable solid state alternating current switching device and said firing control semiconductor device to which they are rigidly mounted and electrically connected as a subunit and passivated to prevent damage by ambient conditions without the necessity of a hermetic sealing enclosure therefor.

References Cited

UNITED STATES PATENTS 3,329,842   7/1967   Brown _____ 318—345 X

OTHER REFERENCES

Howell: General Electric Application Note, May 1964.

ORIS L. RADER, *Primary Examiner.*

H. HUBERFELD, *Assistant Examiner.*

U.S. Cl. X.R.

310—50; 323—22